(12) United States Patent
Li et al.

(10) Patent No.: US 11,550,863 B2
(45) Date of Patent: Jan. 10, 2023

(54) SPATIALLY DYNAMIC DOCUMENT RETRIEVAL

(71) Applicants: Atlassian PTY Ltd., Sydney (AU); Atlassian, Inc., San Francisco, CA (US)

(72) Inventors: Shuai Li, Sunnyvale, CA (US); Jerry Cheng, Mountain View, CA (US)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

(21) Appl. No.: 16/723,126

(22) Filed: Dec. 20, 2019

(65) Prior Publication Data

US 2021/0192002 A1     Jun. 24, 2021

(51) Int. Cl.
*G06F 16/00*     (2019.01)
*G06F 16/9537*     (2019.01)
(Continued)

(52) U.S. Cl.
CPC ........ *G06F 16/9537* (2019.01); *G06F 16/176* (2019.01); *G06F 16/904* (2019.01); *G06F 16/909* (2019.01); *G06F 16/93* (2019.01)

(58) Field of Classification Search
CPC .. G06F 16/909; G06F 16/9537; G06F 16/907; G06F 16/176; G06F 16/904; G06F 16/93; G06F 16/387; G06F 16/38; G06F 16/487; G06F 16/40; G06F 16/43; G06F 16/9535; G06F 16/29; G06F 16/14; G06F 16/148; G06F 16/24575; G06F 16/24578; G06F 16/248; G06F 16/27; G06F 16/435;
(Continued)

(56) References Cited

U.S. PATENT DOCUMENTS

| | | | |
|---|---|---|---|
| 2002/0069312 A1* | 6/2002 | Jones | G06Q 30/02 711/100 |
| 2008/0208847 A1* | 8/2008 | Moerchen | G06F 16/313 707/999.005 |

(Continued)

OTHER PUBLICATIONS

Xu, Rui et al., A New Indoor Positioning System Architecture Using GPS Signals, Sensors, vol. 15, No. 5, (2015), pp. 10074-10087. DOI: 10.3390/s150510074.

*Primary Examiner* — Shyue Jiunn Hwa
(74) *Attorney, Agent, or Firm* — Alston & Bird LLP

(57) ABSTRACT

Systems and methods provide techniques for spatially dynamic document retrieval. In one embodiments, a method includes determining a current spatial-temporal state for a mobile device associated with a target user profile; accessing a document object repository comprising a plurality of document objects, wherein each document object of the plurality of document objects comprises one or more contextual labels and one or more spatial labels; for each document object of the plurality of document objects, determining a spatial-temporal relevance score for the document object with respect to the target user profile based on the one or more contextual labels for the document object, the one or more spatial labels for the document object, and the current spatial-temporal state of the target user profile; and generating a spatially dynamic document prediction interface based on the spatial-temporal relevance score for each document object of the plurality of document objects.

19 Claims, 15 Drawing Sheets

(51) Int. Cl.
*G06F 16/93* (2019.01)
*G06F 16/904* (2019.01)
*G06F 16/176* (2019.01)
*G06F 16/909* (2019.01)

(58) Field of Classification Search
CPC ...... G06F 16/444; G06F 16/60; G06F 16/632; G06F 16/73; G06F 16/951; G06F 16/958; G06F 16/2237; G06F 16/24; G06F 16/313; G06F 16/319; G06F 16/325; G06F 16/3347; G06F 16/338; G06F 3/0481; G06F 3/04817; G06F 3/0482; G06F 3/0484; G06F 3/04842; G06F 3/0488; G06Q 10/101; G06Q 10/103
See application file for complete search history.

(56) References Cited

U.S. PATENT DOCUMENTS

| | | | | |
|---|---|---|---|---|
| 2009/0325602 A1* | 12/2009 | Higgins | ............. | G06F 16/9535 455/456.2 |
| 2011/0184636 A1* | 7/2011 | Rolf | ........................ | G06F 16/29 707/723 |
| 2012/0166432 A1* | 6/2012 | Tseng | ................ | G06F 16/24578 707/728 |
| 2013/0006974 A1* | 1/2013 | Agrawal | ................. | G06F 16/14 707/723 |
| 2013/0166188 A1* | 6/2013 | Zheng | ................. | G06K 9/00624 701/117 |
| 2013/0325856 A1* | 12/2013 | Soto Matamala | .... | G06F 16/248 707/724 |
| 2013/0339345 A1* | 12/2013 | Soto Matamala | .... | G06F 16/248 707/722 |
| 2014/0207730 A1* | 7/2014 | Spataro | .................. | G06F 16/93 707/608 |
| 2014/0274122 A1* | 9/2014 | Tseng | .................... | G01S 5/0205 455/456.1 |
| 2014/0280103 A1* | 9/2014 | Harris | ..................... | G06F 16/29 707/724 |
| 2014/0298207 A1* | 10/2014 | Ittah | ....................... | G06Q 10/00 715/753 |
| 2015/0019520 A1* | 1/2015 | Shtaygrud | ........... | G06F 16/9537 707/706 |
| 2015/0112963 A1* | 4/2015 | Mojtahedi | ........... | G06F 16/9537 707/711 |
| 2015/0128020 A1* | 5/2015 | Chavez | ................. | G06F 40/169 715/230 |
| 2015/0149430 A1* | 5/2015 | Flake | .................... | G06F 16/444 707/706 |
| 2015/0356183 A1* | 12/2015 | Green | ................. | G06F 16/9535 707/724 |
| 2017/0091202 A1* | 3/2017 | Yiu | ...................... | G06F 16/9537 |
| 2017/0091203 A1* | 3/2017 | Hu | ...................... | G06F 16/9537 |
| 2017/0249956 A1* | 8/2017 | Dey | ......................... | G10L 25/48 |
| 2020/0075153 A1* | 3/2020 | Murdoch | .............. | H04W 4/029 |

* cited by examiner

THE FOLLOWING DOCUMENTS MAY BE
RELEVANT TO YOUR CURRENT MEETING:

- MEETING AGENDA   901
- PARTICIAPNT BIOS  902
- SPEECH NOTES     903

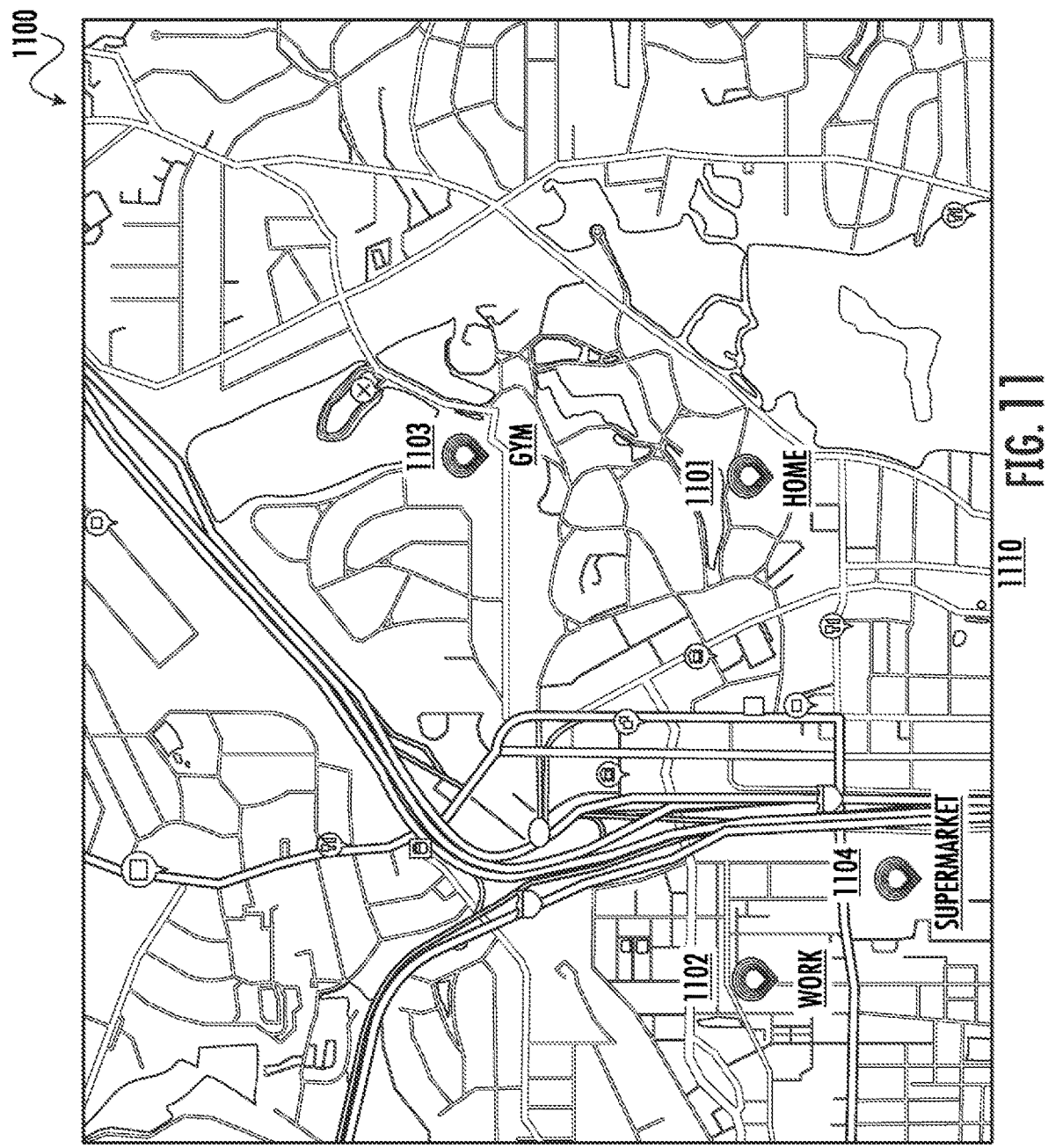

FIG. 12A

✕ CONFLUENCE   SPACES ⌄   PEOPLE   🔍   ⊙ ❓ 💬 👤

TEAMS IN SPACE   ⋯   PAGES   ✏ EDIT   ☆ SAVE FOR LATER   ⊙ WATCHING   ⋖ SHARE   ⋯

1210 — YOU MAY WANT TO VIEW   ☆

⚑ BLOG

SPACE SHORTCUTS
- DECISION LOG
- OUR KANBAN BOARD
- MEDIA ASSETS

PAGE TREE
- › MEETING NOTES
- › DECISION LOG
- › PRODUCT PLANNING
- › PRODUCT REQUIRMENTS
- › TEAMS IN SPACE PR
- • MEET THE SEESPACEEZ TEAM
- • TEAM SPRINT CALENDAR
- • FILE LISTS
- • MEDIA ASSETS

⊙ SPACE TOOLS

AFTER-WORK TO DO LIST     TV MANUAL     CATCHER IN THE RYE

X CONFLUENCE    SPACES ∨ PEOPLE    CREATE ...

TEAMS IN SPACE

PAGES

EDIT    SAVE FOR LATER    WATCHING    SHARE

1210

YOU MAY WANT TO VIEW

BLOG

SPACE SHORTCUTS
- DECISION LOG
- OUR KANBAN BOARD
- MEDIA ASSETS

PAGE TREE
- MEETING NOTES
- DECISION LOG
- PRODUCT PLANNING
- PRODUCT REQUIREMENTS
- TEAMS IN SPACE PR
- MEET THE SEESPACEEZ TEAM
- TEAM SPRINT CALENDAR
- FILE LISTS
- MEDIA ASSETS

SPACE TOOLS

SHOPPING LIST

1204

SPATIALLY DYNAMIC DOCUMENT RETRIEVAL

BACKGROUND

Various methods, apparatuses, and systems are configured to provide techniques for document retrieval in document collaboration systems. Applicant has identified many deficiencies and problems associated with existing methods, apparatuses, and systems for document retrieval in document collaboration systems. Through applied effort, ingenuity, and innovation, these identified deficiencies and problems have been solved by developing solutions that are in accordance with the embodiments of the present invention, many examples of which are described in detail herein.

BRIEF SUMMARY

In general, embodiments of the present invention provide methods, apparatuses, systems, computing devices, and/or the like that are configured to enable document retrieval in document collaboration systems. For example, certain embodiments of the present invention provide methods, apparatuses, systems, computing devices, and/or the like that are configured to enable document retrieval in document collaboration systems using at least one of spatial-temporal states, contextual labels, spatial labels, spatial-temporal relevance scores, and spatially dynamic document prediction interfaces.

In accordance with one aspect, a method is provided. In one embodiment, the method comprises: determining a current spatial-temporal state for a mobile device associated with a target user profile; accessing a document object repository comprising a plurality of document objects, wherein each document object of the plurality of document objects comprises one or more contextual labels and one or more spatial labels; for each document object of the plurality of document objects, determining a spatial-temporal relevance score for the document object with respect to the target user profile based on the one or more contextual labels for the document object, the one or more spatial labels for the document object, and the current spatial-temporal state of the target user profile; and generating a spatially dynamic document prediction interface based on the spatial-temporal relevance score for each document object of the plurality of document objects.

In accordance with another aspect, a computer program product is provided. The computer program product may comprise at least one computer-readable storage medium having computer-readable program code portions stored therein, the computer-readable program code portions comprising executable portions configured to: determine a current spatial-temporal state for a mobile device associated with a target user profile; access a document object repository comprising a plurality of document objects, wherein each document object of the plurality of document objects comprises one or more contextual labels and one or more spatial labels; for each document object of the plurality of document objects, determine a spatial-temporal relevance score for the document object with respect to the target user profile based on the one or more contextual labels for the document object, the one or more spatial labels for the document object, and the current spatial-temporal state of the target user profile; and generate a spatially dynamic document prediction interface based on the spatial-temporal relevance score for each document object of the plurality of document objects.

In accordance with yet another aspect, an apparatus comprising at least one processor and at least one memory including computer program code is provided. In one embodiment, the at least one memory and the computer program code may be configured to, with the processor, cause the apparatus to: determine a current spatial-temporal state for a mobile device associated with a target user profile; access a document object repository comprising a plurality of document objects, wherein each document object of the plurality of document objects comprises one or more contextual labels and one or more spatial labels; for each document object of the plurality of document objects, determine a spatial-temporal relevance score for the document object with respect to the target user profile based on the one or more contextual labels for the document object, the one or more spatial labels for the document object, and the current spatial-temporal state of the target user profile; and generate a spatially dynamic document prediction interface based on the spatial-temporal relevance score for each document object of the plurality of document objects.

BRIEF DESCRIPTION OF THE SEVERAL VIEW OF THE DRAWINGS

Having thus described some embodiments in general terms, references will now be made to the accompanying drawings, which are not drawn to scale, and wherein:

Figure 6:
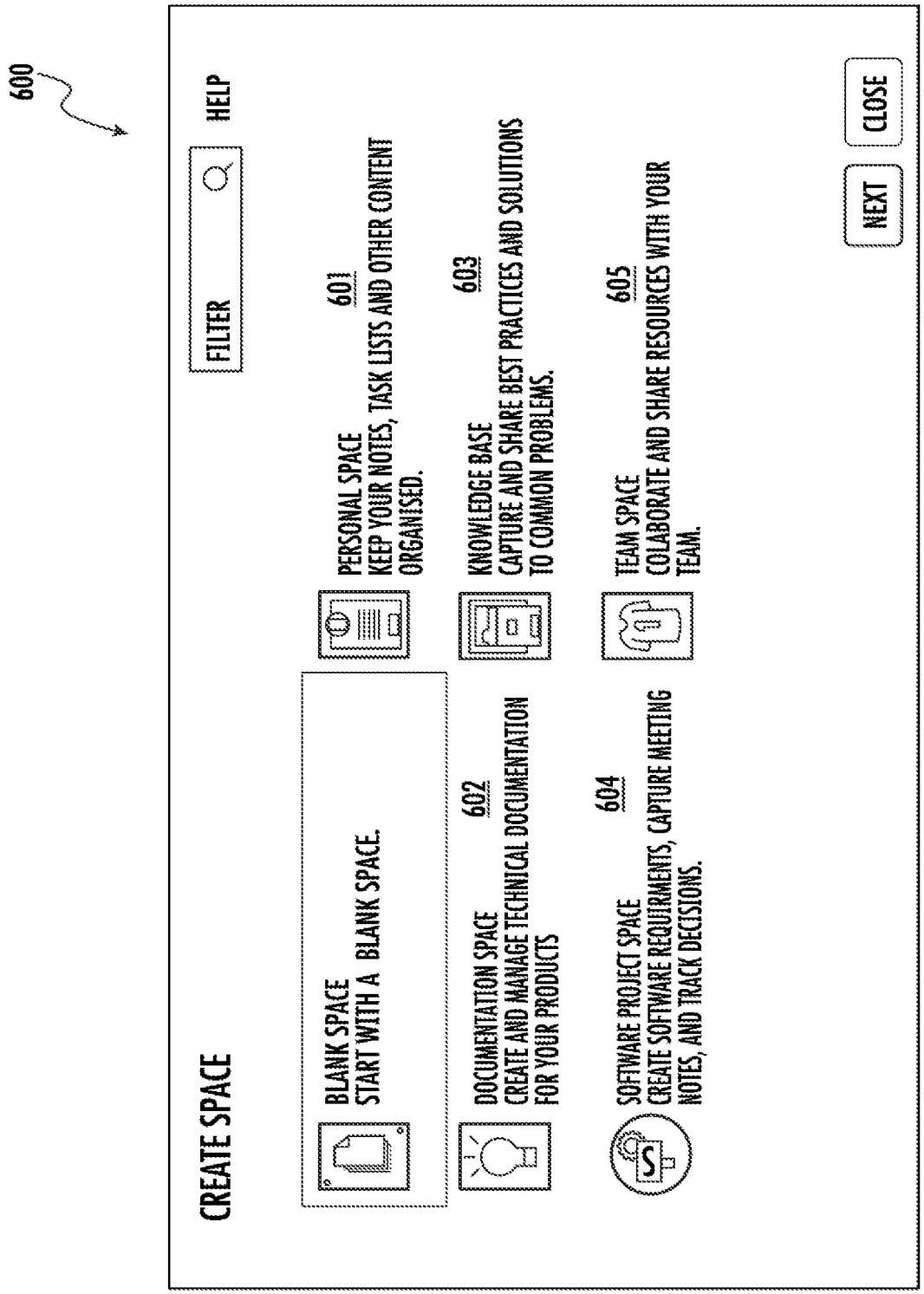

FIG. 6 provides an operational example of a document collaboration space creation user interface in accordance with at least some embodiments of the present invention.

Figure 7:
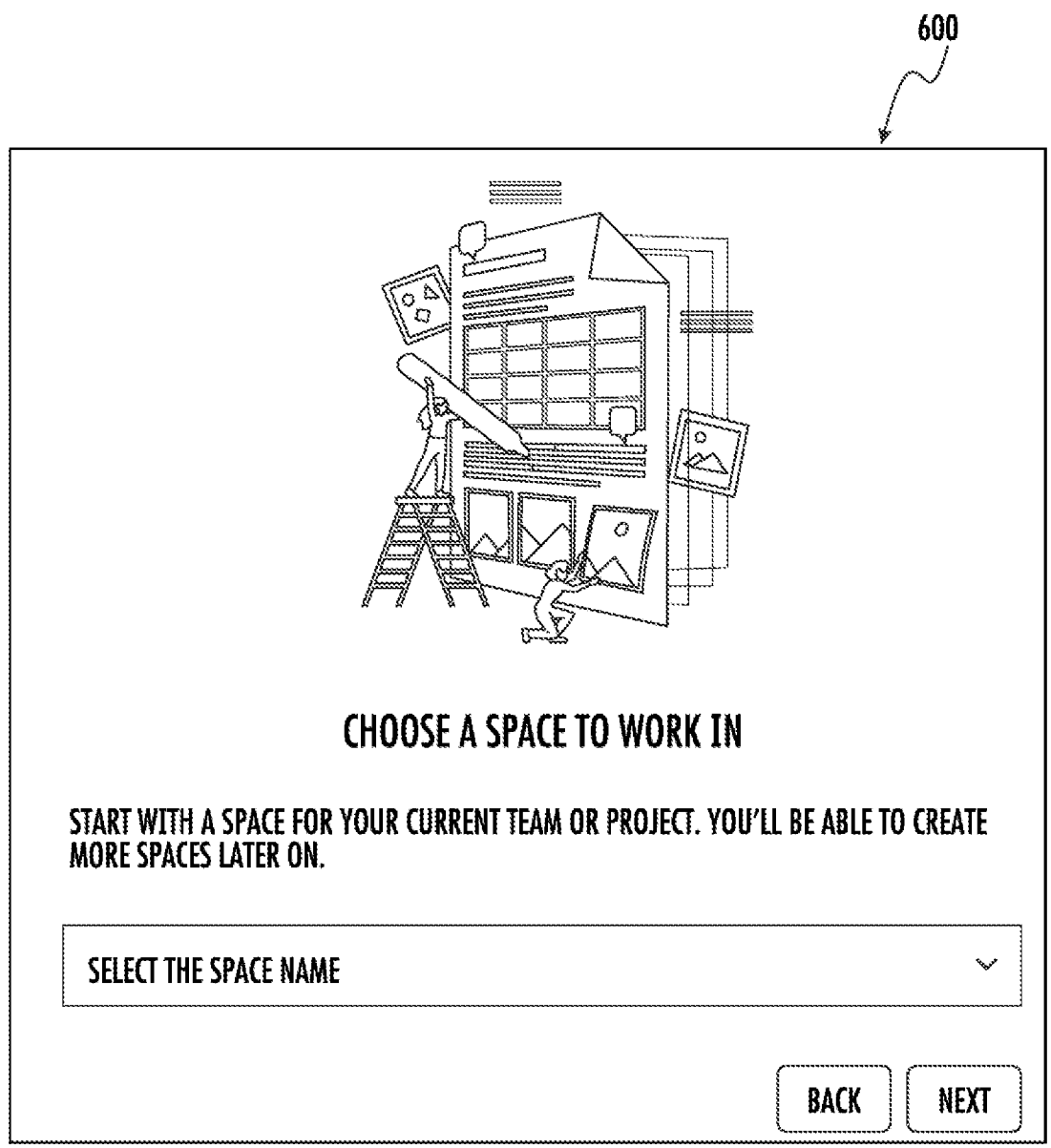

FIG. 7 provides an operational example of a document collaboration space selection user interface in accordance with at least some embodiments of the present invention.

Figure 8:
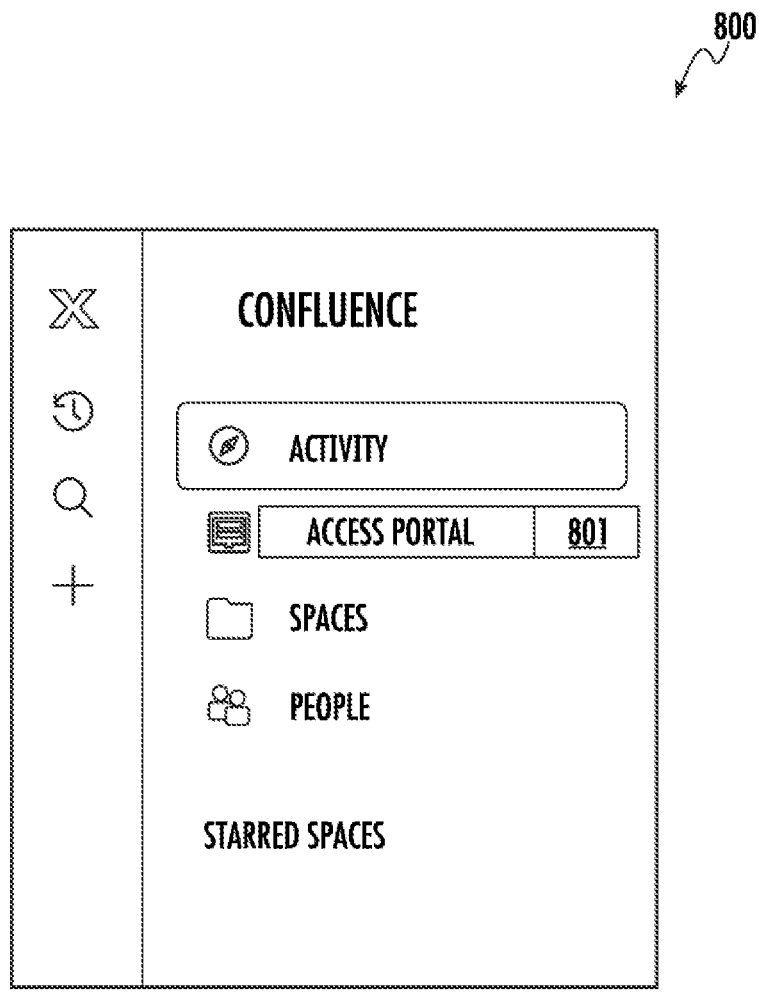

FIG. 8 provides an operational example of a document prediction task bar user interface in accordance with at least some embodiments of the present invention.

FIG. 9 provides an operational example of a document prediction push notification user interface in accordance with at least some embodiments of the present invention.

Figure 10:
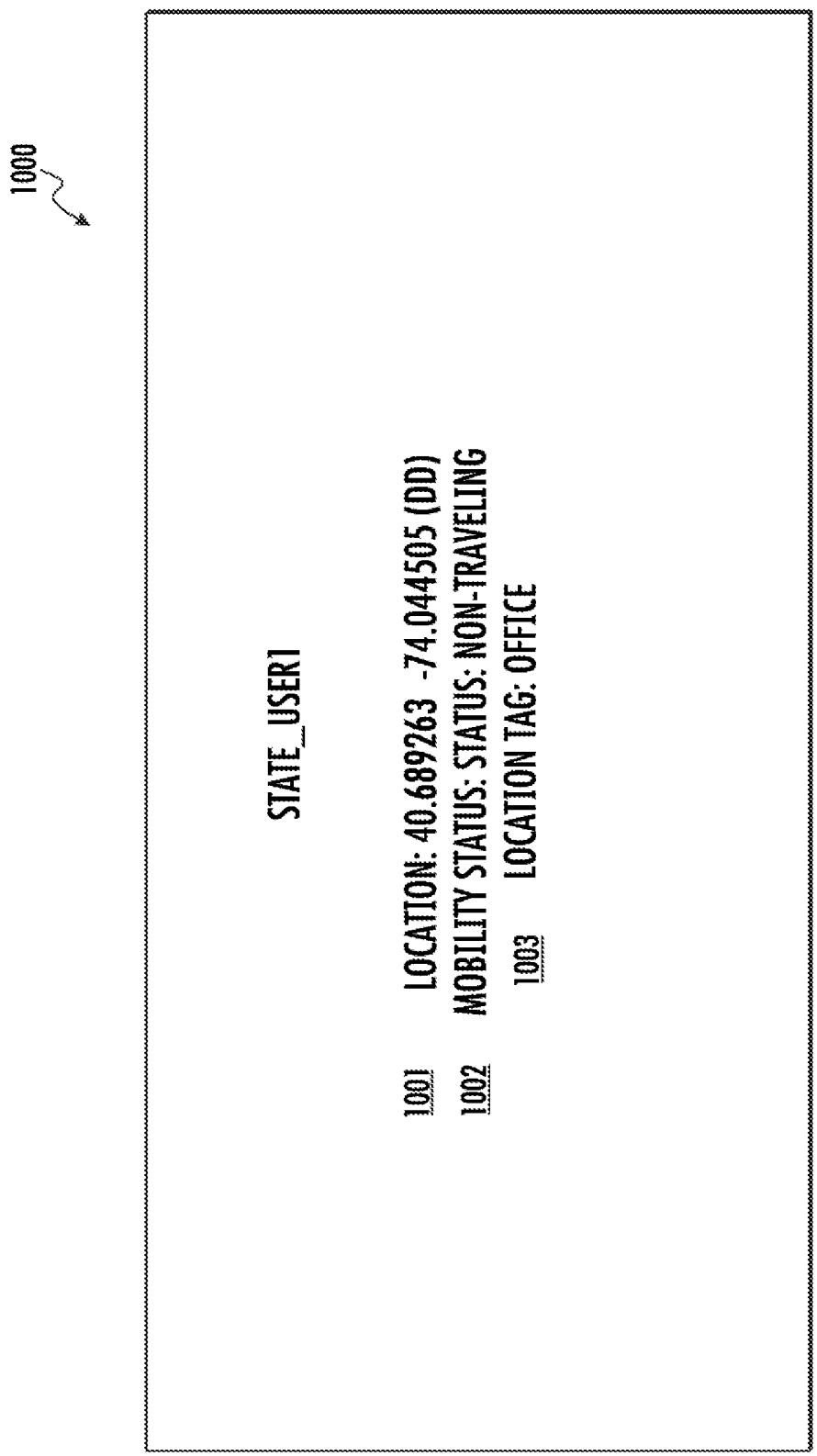

FIG. 10 provides an operational example of a spatial-temporal state data object in accordance with at least some embodiments of the present invention.

FIG. 11 provides an operational example of a geolocation designation interface in accordance with at least some embodiments of the present invention.

FIGS. 12A-12D provide operational examples of spatially dynamic document prediction interfaces in accordance with at least some embodiments of the present invention.

DETAILED DESCRIPTION OF VARIOUS EMBODIMENTS

Various embodiments of the present invention now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

A large-scale document collaboration system may involve managing tens of thousands or millions of document objects. When a user seeks to access one of those document objects, a document collaboration server of the document collaboration system needs to find the desired document object in its large document object repository and transmit the desired document object to a client device associated with a user profile associated with the user. The noted processes can be computationally expensive and plagued by inefficiencies that implicate data storage requirements and document retrieval and rendering latencies.

To address the noted shortcomings, various embodiments of the present invention are directed to systems that are configured for retrieving and presenting document objects in accordance with contextual environments and activity patterns of document-requesting user profiles. For example, in some embodiments, a document collaboration server determines a current spatial-temporal state for a mobile device associated with a target user profile; determines a spatial-temporal relevance score for each document object with respect to the target user profile based on one or more contextual labels for the document object, one or more spatial labels for the document object, and the current spatial-temporal state of the target user profile; and generates a spatially dynamic document prediction interface based on the spatial-temporal relevance score for each document object of the plurality of document objects.

By utilizing the noted techniques for retrieving and presenting document objects in accordance with contextual environments and activity patterns of document-requesting user profiles, various embodiments of the present invention incorporate predictive signals that indicate a predicted relevance of document objects to user profiles given contextual environments and activity patterns of document-requesting user profiles. In doing so, the noted embodiments of the present invention can limit the number of document objects that a document collaboration server needs to query in order to process document retrieval requests. By limiting the number of document objects that a document collaboration server needs to query in order to process document retrieval requests, the described embodiments of the present invention enhance computational and data storage efficiency of document detection and document retrieval in large-scale document collaboration systems. Accordingly, various embodiments of the present invention improve computational and data storage efficiency of document detection and document retrieval in large-scale document collaboration systems.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal.

The term "client device" refers to computer hardware and/or software that is configured to access a service made available by a server. The server is often (but not always) on another computer system, in which case the client accesses the service by way of a network. Client devices may include, without limitation, smart phones, tablet computers, laptop computers, wearables, personal computers, enterprise computers, and the like.

The term "current spatial-temporal state" is a data object that indicates a prediction about a geographic association of a client device during a particular time interval (e.g., a current point in time, a time interval that includes the current point in time as well as a period of time before and after the current point in time, etc.). The prediction about the geographic association of the client device may be based on a current geolocation designation for the client device (e.g., a current geolocation designation based on GPS coordinates of the client device), a current mobility designation for the client device (e.g., a current mobility designation based on comparing current geolocation designations for the client device over a period of time), a geolocation correlation between the current geolocation designation for the client device and the geolocation coordinates of one or more predefined spatial labels (e.g., a geolocation correlation between the current geolocation of a mobile device and geolocation coordinates of a particular office location to determine whether the mobile device is at the particular office location), etc. For example, a current spatial-temporal state for a client device may indicate that the client device is at an office location. As another example, a current spatial-temporal state for a client may indicate that the client device is traveling between an office location and a residential location. As a further example, a current spatial-temporal state for a client may indicate that the client device is traveling from a first meeting room of an office location to a second meeting room of an office location.

The term "current geolocation designation" refers to a data object that indicates a location of a client device at a particular point in time (e.g., GPS coordinates of the client device at a particular point in time). In some embodiments, a document collaboration server determines the current geolocation designation for the client device based on a geolocation identifying data object for the client device. In some of those embodiments, the geolocation identifying data object for the client device is generated based on at least one of the following: (i) sensor output data from a geolocation reporting sensor (e.g., a GPS sensor) of the client device, (ii) an interaction between the mobile device and a machine-readable optical label (e.g., a Quick Response (QR) code label or a barcode label), (iii) a connection between the client device and a geolocation-registered communication network (e.g., a home WiFi network or an office WiFi network), and (iv) a short-range communication interaction (e.g., a Bluetooth communication interaction) between the client device and a geolocation-registered computing device.

The term "current mobility designation" refers to a data object that indicates a magnitude and a direction of velocity of a client device at a particular point in time. In some embodiments, the current mobility designation for the client device may be determined based on comparing current geolocation designations for the client device over a temporally continuous period of time (e.g., the system may calculate a velocity for a client device by comparing a GPS position at time t1 to a second position at time t2). In some embodiments, the current mobility designation for the client device may be determined based on output data from a velocity reporting sensor of the client device. In some embodiments, the current mobility designation for the client device may be determined based on output data from a gyroscopic reporting sensor of the client device.

The term "predicted travel trajectory" refers to a data object that indicates an estimated path along which a client device is moving given its current geolocation designation and current mobility designation. In some embodiments, determining the predicted travel trajectory for a client device includes determining the predicted travel trajectory based on estimating a path that starts at the current geolocation designation and traverses in a direction that is substantially aligned with the direction information included in the current mobility designation. In some embodiments, determining the predicted travel trajectory for a client device is further performed based on the magnitude information in the current mobility designation, such as for example by determining a shorter estimated path and/or an empty estimated path if the magnitude information indicate a below-threshold velocity magnitude. In still other embodiments, determining the predicted travel trajectory for a client device includes merging client device GPS location data with map data such as that made available from Google® Maps API. In other embodiments, local map data may be used such as proprietary maps of buildings, rooms, or campuses.

The term "contextual label" refers to a data object that indicates an estimated relevance of a document object to an inferred environmental context of devices seeking to access the document object and/or an activity patterns of user profiles associated with the devices that seek to access the document object. Examples of contextual labels include mobility designations, topic labels, etc. Examples of contextual labels include absolute contextual labels and weighted contextual labels. An absolute contextual label may be a data object that, when used to associate a document object with an environment context and/or activity pattern, indicates that the document object is estimated to be relevant to the environment context and/or activity pattern. A weighted contextual label may be a data object that, when used to associate a document object with an environment context and/or activity pattern, indicates a degree of relevance of the document object to the environment context and/or activity pattern (e.g., a discrete degree of relevance or a continuous degree of relevance). An example of an absolute contextual label is a contextual label that indicates that a document is related to finance matters, administrative matters, etc. An example of a weighed contextual label is a contextual label that indicates that a document is 20% related to finance matters, 40% related to administrative matters, etc. In some embodiments, at least some of the contextual labels of a document object are determined based on one or more machine learning models, e.g., a machine learning models trained using natural language features of the document objects as input data and past user usage of the natural language documents by one or more users as target output data.

The term "spatial label" refers to a data object that indicates an estimated relevance of the document object to a spatial-temporal state. Examples of spatial labels include absolute spatial labels and weighted spatial labels. An absolute spatial label may be a data object that, when used to associate a document object with a current spatial-temporal state, indicates that the document object is estimated to be relevant to the current spatial-temporal state. A weighted spatial label may be a data object that, when used to associate a document object with a current spatial-temporal state, indicates a degree of relevance of the document object to the current spatial-temporal state (e.g., a discrete degree of relevance or a continuous degree of relevance). An example of an absolute spatial label is a spatial label that indicates that a document is related to an office location, a home location, etc. An example of a weighed spatial label is a spatial label that indicates that a document is 20% related to an office location, 40% a home location, etc. In some embodiments, at least some of the spatial labels of a document object are determined based on one or more machine learning models, e.g., a machine learning models trained using natural language features of the document objects as input data and past user usage of the natural language documents by one or more users as target output data.

The term "document collaboration space" refers to a data object associated with one or more enrolled user profiles that enables giving defined access privileges to each related user profile associated with the document collaboration space with respect to a particular document object by associating the particular document object with the document collaboration space. Examples of document collaboration spaces include personal document collaboration spaces and collective document collaboration spaces. A personal document collaboration space may be a space that is statically (i.e., immutably) associated with a single enrolled user profile, while a collective document collaboration space may be a space that is dynamically (i.e., in a modifiable manner) associated with one or more enrolled user profiles. Examples of collective document collaboration spaces include team document collaboration spaces associated with one or more team member user profiles, project document collaboration spaces associated with one or more project participant user profiles, site document collaboration spaces associated with one or more site user profiles, etc.

The term "spatial-temporal relevance score" refers to a data object that indicates an estimated relevance of a document object to a user profile given a current spatial-temporal state of the user profile. In some embodiments, to generate a spatial-temporal relevance score for a document object with respect to a user profile, a document collaboration server generates a relevance score vector that includes a relevance score for the document object with respect to each of a set of potential spatial-temporal states and selects, from the relevance score vector, the relevance score associated with the current spatial-temporal state of the user profile. In some embodiments, to generate a spatial-temporal relevance score for a document object with respect to a user profile, the document collaboration server generates a relevance score for each contextual label or each spatial label of the document object with respect to the current spatial temporal state of the user profile and aggregates (e.g., averages) each generated relevance score to generate the spatial-temporal relevance score.

The term "spatially dynamic document prediction interface" refers to a user interface configured to present indications of a group of document objects based on spatial-temporal relevance scores associated with the document objects. In some embodiments, a spatially dynamic document prediction interface includes indications of a preconfigured number of document objects having the highest spatial-temporal relevance score. In some embodiments, a spatially dynamic document prediction interface includes indications of any document objects whose respective spatial-temporal relevance scores exceed a document presentation threshold. In some embodiments, a spatially dynamic document prediction interface is accessible using a sidebar icon in a user interface associated with a document collaboration application.

The term "document object repository" refers to a combination of one or more storage devices that are configured to store one or more document objects along with contextual labels and spatial labels for each document object. The document object repository may include a group of distributed storage devices. For example, one storage device may store document objects while another storage device may store metadata information about document objects such as contextual label data and spatial label data for the document objects. In some embodiments, the document object repository is implemented as a software-as-a-service platform using a cloud-based web services service. In some embodiments, the document object repository stores redundant copies of document object data and/or document object metadata in distributed storage platforms in order to decrease probability of data unavailability due to system failures and/or data loss scenarios.

The term "geolocation identifying data object" refers to a data object received from a computing device that indicates a geolocation of the computing device at a time interval indicated in the geolocation identifying data object and/or at a time interval deemed to be sufficiently close to a time of dispatch and/or a time of receipt of the geolocation identifying data object. Examples of geolocation identifying data objects include data objects that indicate GPS coordinates of a data object at a particular time.

The term "geolocation reporting sensor device" refers to any electronic device configured to generate an indication of at least one property of a physical environment of the electronic device. Examples of geolocation reporting sensor devices include image sensor devices (e.g., cameras), location-reporting sensor devices, temperature-identifying sensor devices, velocity-reporting sensor devices, pressure-reporting sensor devices, orientation-reporting sensor devices, etc.

The term "sensor output data" refers to any data object generated by a geolocation reporting sensor device. Examples of sensor output data include image data objects recorded by an image sensor (e.g., a camera), temperature data objects recorded by a thermometer, proximity data objects recorded by a proximity sensor, acceleration data objects record by an accelerometer, pressure data objects recorded by a pressure sensor, position data objects recorded by a position sensor, etc.

The term "short-range communication interaction" refers to any exchange of data objects, where the exchange of data objects is performed using a short-range communication channel between two or more communication devices. Examples of short-range communication channels include Bluetooth communication channels, Near-Field Communication (NFC) communication channels, Near-Field Communication-Contactless (NFC/CTLS) communication channels, etc.

The term "intention prediction" refers to a data object that describes one or more user activities of a particular user profile based on at least one of a current geolocation designation of a mobile device associated with the particular user profile one or more activity planning data objects (e.g., confirmed calendar entries) associated with the user profile. In some embodiments, the intention prediction is determined using an intention prediction machine learning model trained to determine user activity designations based on current geolocation designation data and activity planning data, where the intention prediction machine learning model is trained using past document search history data associated with the user profile.

Example System Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

Figure 1:
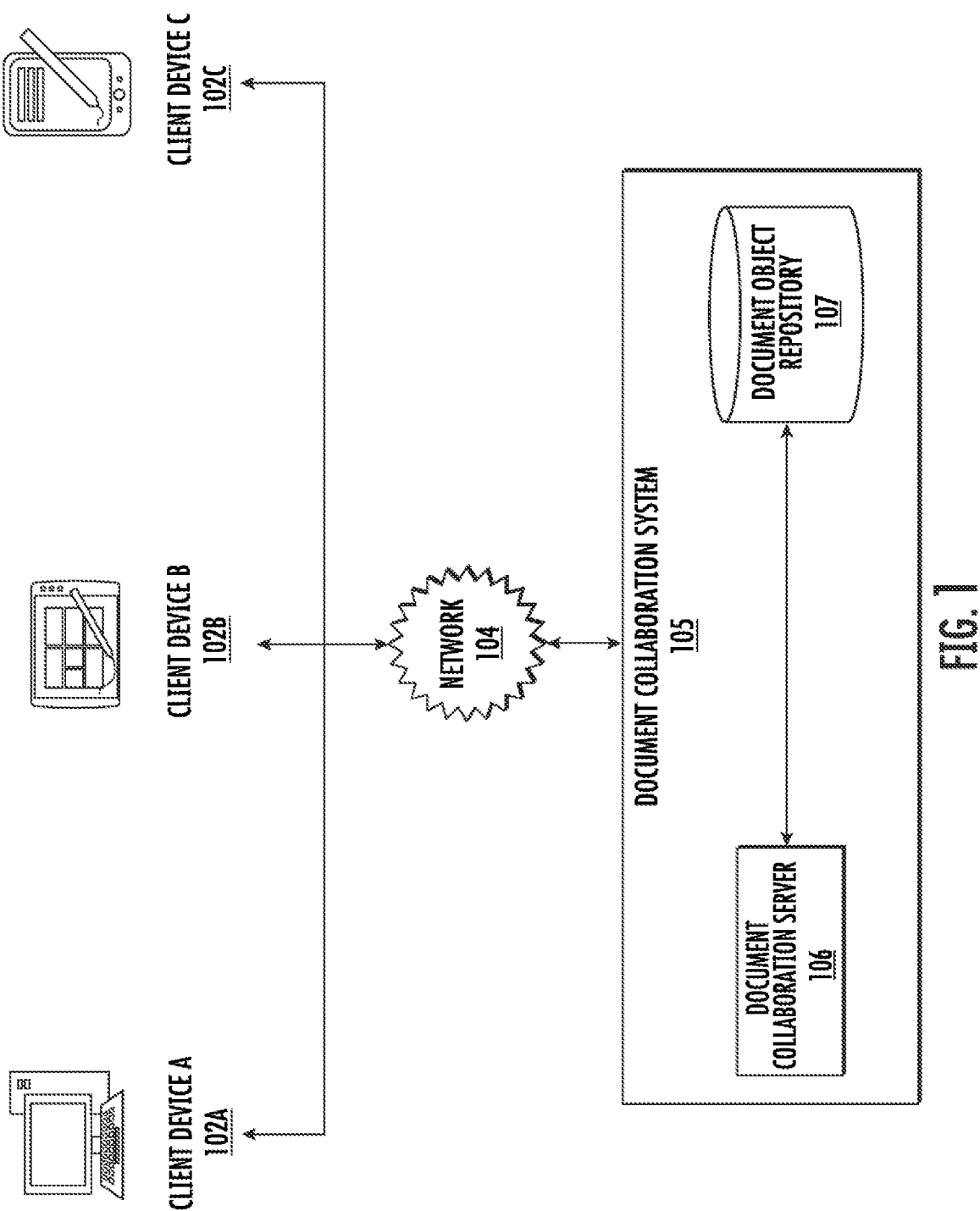
FIG. 1 is a block diagram of an example document collaboration system and network architecture within which at least some embodiments of the present invention may operate.

FIG. 1 illustrates an example system architecture 100 within which embodiments of the present invention may operate. The architecture 100 includes a document collaboration system 105 configured to interact with one or more client devices 102A-C, such as client device 102A, client device B 102B, and client device C 103. The document collaboration system 105 may be configured to receive document retrieval requests from the client devices 102A-C, process the document retrieval requests to generate user interfaces that include data associated with requested documents, and provide rendering data associated with the user interfaces to the client devices 102A-C. The document collaboration system 105 may be configured to detect current spatial-temporal states of client devices 102A-C and provide data associated with document objects deemed relevant to the current spatial-temporal states of client devices 102A-C to those client devices 102A-C.

The document collaboration system 105 may communicate with the client devices 102A-C using a network 104. The network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the network 104 may include a cellular telephone, an 802.11, 802.16, 802.20, and/or WiMax network. Further, the network 104 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the group-based communication system. In some embodiments, the protocol is a custom protocol of JavaScript Object Notation (JSON) objects sent via a Websocket channel. In some embodiments, the protocol is JSON over RPC, JSON over REST/HTTP, and the like.

The document collaboration system 105 may include a document collaboration server 106 and a document object repository 107. The document collaboration server 106 may be configured to detect spatial-temporal states for client devices, determine spatial-temporal relevance scores for document objects given the detected spatial-temporal states for client devices, and generate spatially dynamic document prediction interface based on the spatial-temporal relevance scores. The document collaboration server 106 may be configured to generate push notification user interfaces for document objects whose spatial-temporal relevance score exceeds a critical relevance threshold.

The document object repository 107 may store data associated with one or more document objects associated with the document collaboration system 105. The document object repository 107 may include one or more storage units, such as multiple distributed storage units that are connected through a computer network. Each storage unit in the document object repository 107 may store at least one of one or more data assets and/or one or more data about the computed properties of one or more data assets. Moreover, each storage unit in the document object repository 107 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Document Collaboration Server

Figure 2:
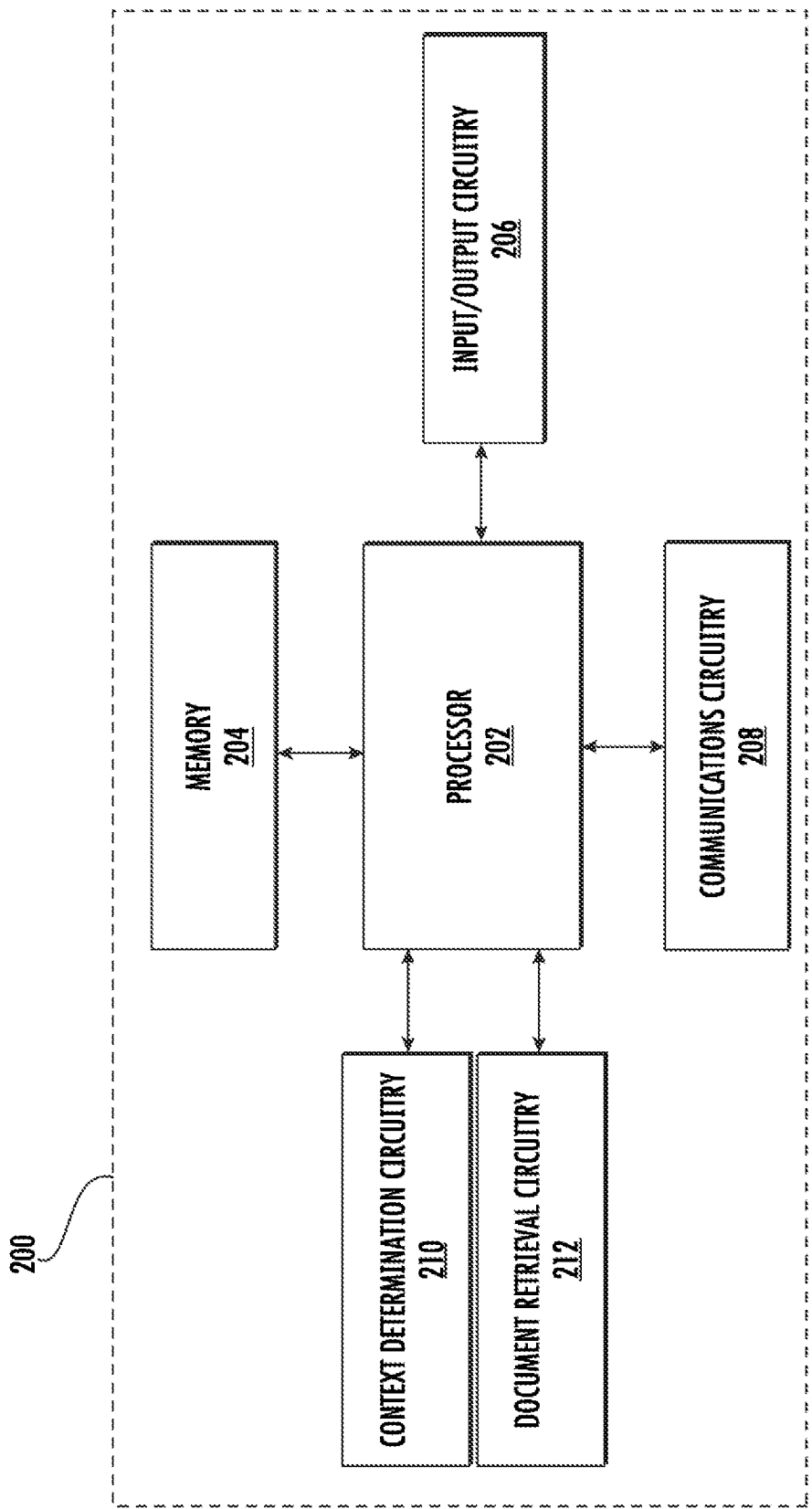
FIG. 2 is a block diagram of an example document collaboration server configured in accordance with at least some embodiments of the present invention.

The document collaboration server 106 may be embodied by one or more computing systems, such as apparatus 200 shown in FIG. 2. The apparatus 200 may include processor 202, memory 204, input/output circuitry 206, communications circuitry 208, context determination circuitry 210, and document retrieval circuitry 212. The apparatus 200 may be configured to execute the operations described herein. Although these components 202-212 are described with respect to functional limitations, it should be understood that the particular implementations necessarily include the use of particular hardware. It should also be understood that certain of these components 202-212 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

The context determination circuitry 210 may be any means such as a device or circuitry embodied in either hardware or a combination of hardware and software that is configured to identify a current spatial-temporal state of a user profile associated with a client device 102A-C. In some embodiments, the context determination circuitry 210 may be configured to determine current spatial-temporal states for particular client devices based on data received from one or more sensory devices operating on the client devices. In some embodiments, to obtain data from the one or more sensory devices operating on the client devices, the context determination circuitry 210 utilizes the communications circuitry 208 to transmit application programming interface (API) calls to one or more API servers associated with the noted client devices.

The document retrieval circuitry 212 may be any means such as a device or circuitry embodied in either hardware or a combination of hardware and software that is configured to generate spatial-temporal relevance scores for document objects stored in the document object repository 107 based on the spatial-temporal state states determined by the context determination circuitry 210. The document retrieval circuitry 212 may be further configured to retrieve document objects from the document object repository 107 based on the generated spatial-temporal relevance scores. The document retrieval circuitry 212 may be further configured to generate user interfaces that include data associated with the retrieved document objects.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Exemplary Client Device

Figure 3:
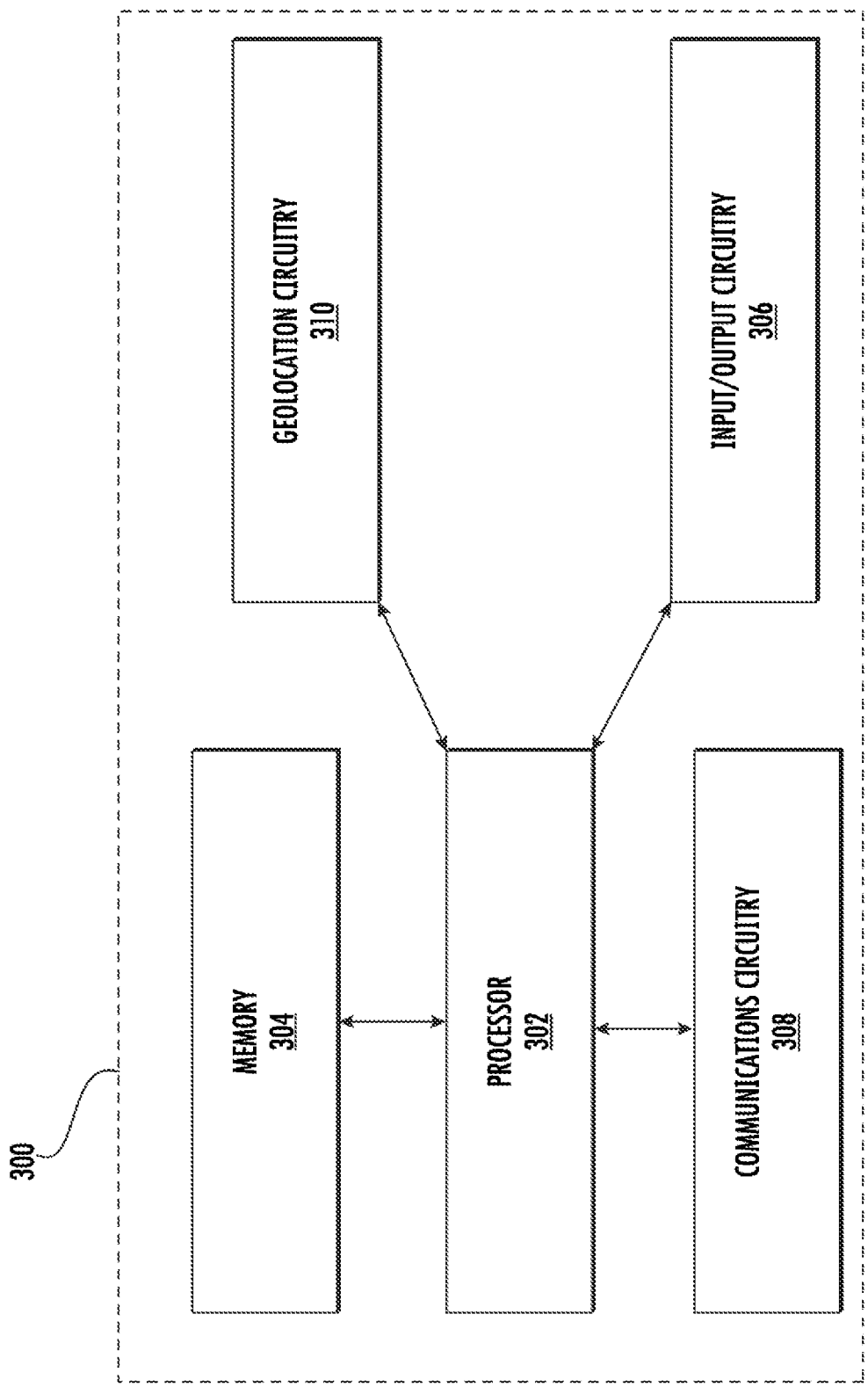
FIG. 3 is a block diagram of an example client device configured in accordance with at least some embodiments of the present invention.

Referring now to FIG. 3, the client device 102A-C may be embodied by one or more computing systems, such as apparatus 300 shown in FIG. 3. The apparatus 300 may include processor 302, memory 304, input/output circuitry 306, communications circuitry 308, and geolocation circuitry 310. Although these components 302-310 are described with respect to functional limitations, it should be understood that the particular implementations necessarily include the use of particular hardware. It should also be understood that certain of these components 302-310 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like. In some embodiments, the input/output circuitry 306 may also include a keyboard (e.g., also referred to herein as keypad), a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communications circuitry 308 may include the circuitry for interacting with the antenna/antennae to cause transmission of signals via the antenna/antennae or to handle receipt of signals received via the antenna/antennae.

The geolocation circuitry 310 may be any means such as a device or circuitry embodied in either hardware or a combination of hardware and software that is configured to report a current geolocation of the apparatus 300. In some embodiments, the geolocation circuitry 310 may be configured to communicate with a satellite-based radio-navigation system such as the GPS system. In some embodiments, the geolocation circuitry 310 may be configured to infer an indoor geolocation and/or a sub-structure geolocation of the apparatus 300 using signal acquisition and tracking and navigation data decoding, where the signal acquisition and tracking and the navigation data decoding is performed using GPS signals and/or GPS-like signals. Example techniques for performing indoor geolocation and/or sub-structure geolocations is presented in Xu et al., *A New Indoor Positioning System Architecture Using GPS Signals*, 15(5) Sensors 10074-10087 (2015), available at https://doi.org/10.3390/s150510074. Other examples of geolocation determination include Wi-Fi triangulation and ultra-wideband radio technology.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Example Data Flows and Operations

To address some of the efficiency-related shortcomings of various existing document collaboration systems, various embodiments of the present invention disclose techniques for retrieving and presenting document objects in accordance with contextual environments and activity patterns of document-requesting user profiles. For example, in some embodiments, a document collaboration server determines a current spatial-temporal state for a mobile device associated with a target user profile; determines a spatial-temporal relevance score for each document object with respect to the target user profile based on one or more contextual labels for the document object, one or more spatial labels for the document object, and the current spatial-temporal state of the target user profile; and generates a spatially dynamic document prediction interface based on the spatial-temporal relevance score for each document object of the plurality of document objects.

By utilizing the noted techniques for retrieving and presenting document objects in accordance with contextual environments and activity patterns of document-requesting user profiles, various embodiments of the present invention incorporate predictive signals that indicate predicted relevance of document objects to user profiles given contextual environments and activity patterns of document-requesting user profiles. In doing so, the noted embodiments of the present invention can limit the number of document objects that a document collaboration server needs to explore in order to process document retrieval requests. By limiting the number of document objects that a document collaboration server needs to explore in order to process document retrieval requests, the described embodiments of the present invention enhance computational and storage-wise efficiency of document detection and document retrieval in large-scale document collaboration system. Accordingly, various embodiments of the present invention improve computational and storage-wise efficiency of document detection and document retrieval in large-scale document collaboration system and make important technical contributions to enhancing computational and storage-wise efficiency of document detection and document retrieval in large-scale document collaboration system.

Figure 4:
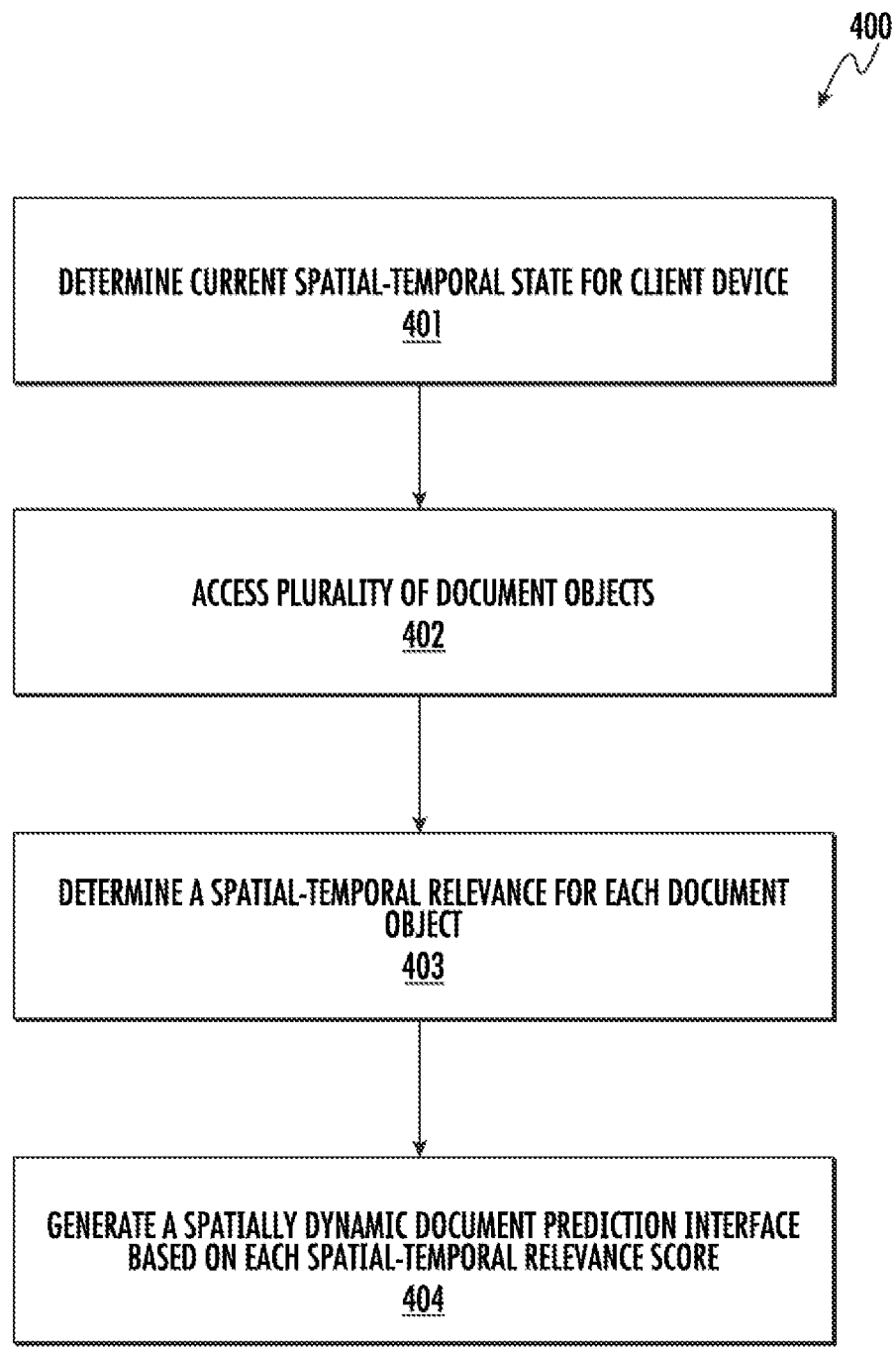
FIG. 4 is a flowchart diagram of an example process for spatially dynamic document presentation by a specially configured document collaboration system in accordance with at least some embodiments of the present invention.

FIG. 4 is a flowchart diagram of an example process 400 for spatially dynamic document presentation in a document collaboration system 105. Via the various operations of process 400, the document collaboration server 106 of the document collaboration system 105 can enhance efficiency and effectiveness of collaborative document retrieval and collaborative document presentation by integrating contextual and spatial considerations in determining whether and how to present document objects to end users.

The process 400 begins at operation 401 when the document collaboration server 106 determines a current spatial-temporal state for a client device 102A-C (e.g., a mobile device) associated with a target user profile. The current spatial-temporal state for a client device is a prediction about a geographic association of the client device during a particular time interval (e.g., a current point in time, a time interval that includes the current point in time as well as a period of time before and after the current point in time, etc.). The prediction about the geographic association of the client device may be based on a current geolocation designation for the client device (e.g., a current geolocation designation based on GPS coordinates of the client device), a current mobility designation for the client device (e.g., a current mobility designation based on comparing current geolocation designations for the client device over a period of time), a geolocation correlation between the current geolocation designation for the client device and the geolocation coordinates of one or more predefined spatial labels (e.g., a geolocation correlation between the current geolocation of a mobile device and geolocation coordinates of a particular office location to determine whether the mobile device is at the particular office location), etc.

For example, a current spatial-temporal state for a client device may indicate that the client device is at an office location. As another example, a current spatial-temporal state for a client may indicate that the client device is traveling between an office location and a residential location. As a further example, a current spatial-temporal state for a client may indicate that the client device is traveling from a first meeting room of an office location to a second meeting room of an office location.

In some embodiments, the document collaboration server 106 may determine the current spatial-temporal state of a client device based on document browsing activity of a user profile associated with the client device. For example, if the user profile is browsing workplace-related documents, the document collaboration server 106 may determine that the client device is likely at the workplace even without using any geolocation designation data transmitted by the client device.

An operational example of a current spatial-temporal state 1000 is presented in FIG. 10. As depicted in FIG. 10, the current spatial-temporal state 1000 indicates a location field 1001 which indicates a GPS coordinate, a mobility status field 1002, and a location tag field 1003. The location field 1001 indicates a GPS coordinate for a current location of a target user profile. The mobility status field 1002 indicates a non-mobile status for the target user profile. The location tag field 1003 indicates a descriptor for the GPS coordinated indicated by the location field 1001, i.e., an "office" descriptor for the GPS coordinated indicated by the location field 1001.

Figure 5:
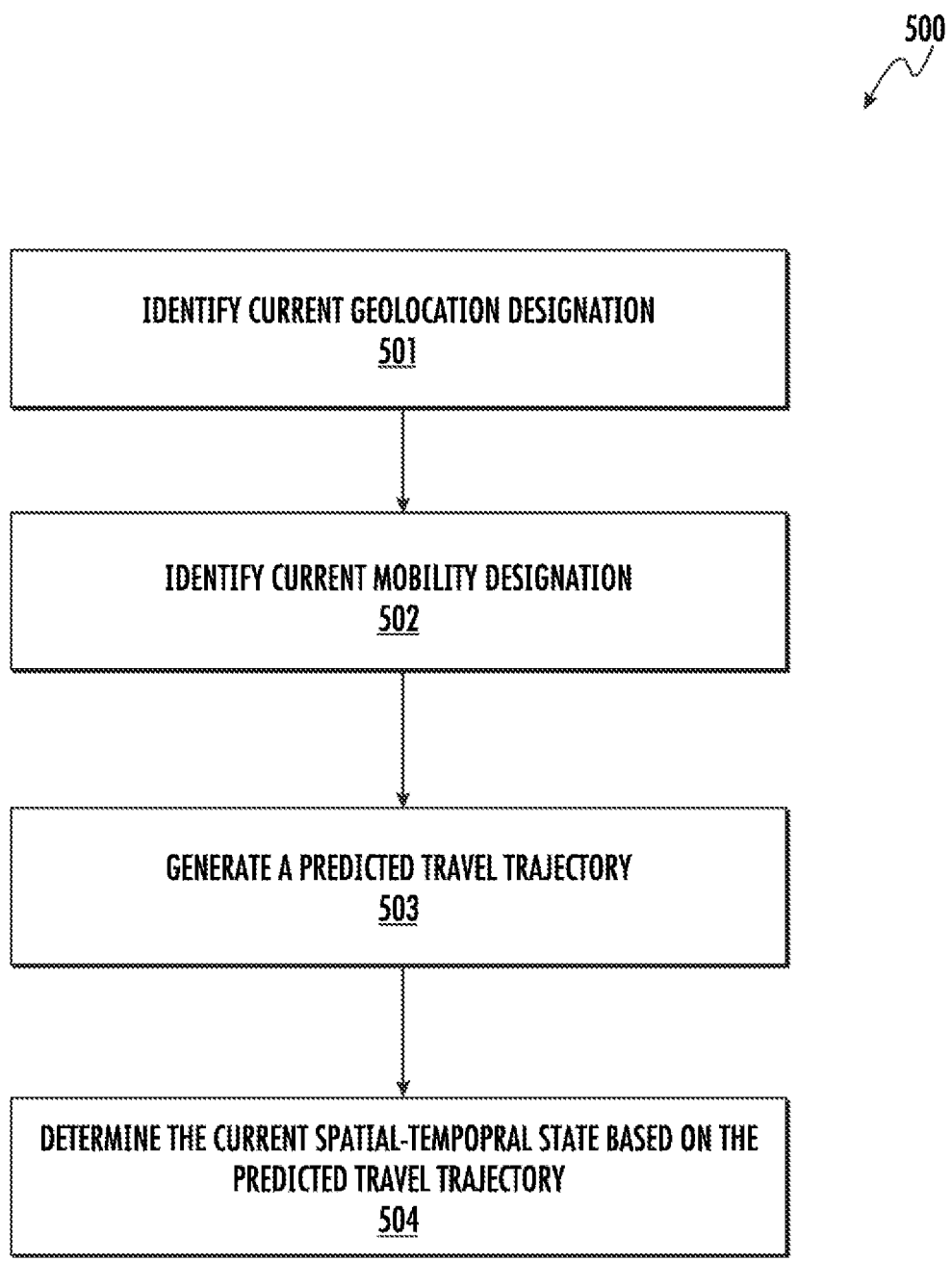
FIG. 5 is a flowchart diagram of an example process for determining a current spatial-temporal state for a client device using predictive mobility adjustment in accordance with at least some embodiments of the present invention.

Returning to FIG. 4, in some embodiments, operation 401 may be performed in accordance with the operations depicted in FIG. 5, which is a flowchart diagram of an example process 500 for determining a current spatial-temporal state for a client device using predictive mobility adjustment. The process 500 begins at operation 501 when the document collaboration server 106 identifies a current geolocation designation for the client device. A current geolocation designation for the client device is any indication of a location of the client device at a particular point in time (e.g., GPS coordinates of the client device at a particular point in time). In some embodiments, the document collaboration server 106 determines the current geolocation designation for the client device based on a geolocation identifying data object for the client device. In some of those embodiments, the geolocation identifying data object for the client device is generated based on at least one of the following: (i) sensor output data from a geolocation reporting sensor device (e.g., a GPS sensor device) of the client device, (ii) an interaction between the mobile device and a machine-readable optical label (e.g., a QR code label or a barcode label), (iii) a connection between the client device and a geolocation-registered communication network (e.g., a home WiFi network or an office WiFi network), and (iv) a short-range communication interaction (e.g., a Bluetooth communication interaction) between the client device and a geolocation-registered computing device.

At operation 502, the document collaboration server 106 identifies a current mobility designation for the client device. The current mobility designation for the client device is any indication of a magnitude and a direction of velocity of the client device at a particular point in time. In some embodiments, the current mobility designation for the client device may be determined based on comparing current geolocation designations for the client device over a temporally continuous period of time. In some embodiments, the current mobility designation for the client device may be determined based on output data from a velocity reporting sensor of the client device. In some embodiments, the current mobility designation for the client device may be determined based on output data from a gyroscopic reporting sensor of the client device.

At operation 503, the document collaboration server 106 generates a predicted travel trajectory for the client device based on the current geolocation designation of the client device and the current mobility designation of the client device. The predicted travel trajectory for the client device is an indication of an estimated path along which the client device is moving given its current geolocation designation and current mobility designation. In some embodiments, determining the predicted travel trajectory for a client device includes determining the predicted travel trajectory based on estimating a path that starts at the current geolocation designation and traverses in a direction that is substantially aligned with the direction information included in the current mobility designation. In some embodiments, determining the predicted travel trajectory for a client device is further performed based on the magnitude information in the current mobility designation, such as for example by determining a shorter estimated path and/or an empty estimated path if the magnitude information indicate a below-threshold velocity magnitude.

At operation 504, the document collaboration server 106 generates the current spatial-temporal state for the client device based on the predicted travel trajectory for the client device. In some embodiments, to generate the current spatial-temporal state for the client device based on the predicted travel trajectory for the client device, the document collaboration server 106 first identifies a starting geolocation designation and an ending geolocation designation for the predicted travel trajectory. Then, the document collaboration server 106 correlates (e.g., using a triangulation algorithm) the starting geolocation designation and the ending geolocation designation with a set of labeled geographic designations (e.g., an office geographic designation, a home geographic designation, etc.) to come up with a starting geographic designation and an ending geographic designation for the predicted travel trajectory. In some of the noted embodiments, if the starting geographic designation and the ending geographic designation for the predicted travel trajectory are the same, the document collaboration server 106 indicates as the current spatial-temporal state for the client device that the client device is at the starting geographic designation. However, if the starting geographic designation and the ending geographic designation for the predicted travel trajectory are not the same, the document collaboration server 106 indicates as the current spatial-temporal state for the client device that the client device is traveling from the starting geographic designation to the ending geographic designation.

Returning to FIG. 4, at operation 402, the document collaboration server 106 accesses a document object repository 107 comprising a plurality of document objects, wherein each document object of the plurality of document objects is associated with (e.g., includes) one or more contextual labels and one or more spatial labels. A contextual label for a document object is a data object that indicates an estimated relevance of the document object to an inferred environmental context of devices seeking to access the document object and/or an activity patterns of user profiles associated with the devices seeking to access the document object. Examples of contextual labels include mobility designations, topic labels, etc. A spatial label for a document object is a data object that indicates an estimated relevance of the document object to a spatial-temporal state.

Examples of contextual labels include absolute contextual labels and weighted contextual labels. An absolute contextual label may be a data object that, when used to associate a document object with an environment context and/or activity pattern, indicates that the document object is estimated to be relevant to the environment context and/or activity pattern. For example, an absolute contextual label for a particular document object may indicate that the particular document object relates to an "at_meetingA" activity pattern. A weighted contextual label may be a data object that, when used to associate a document object with an environment context and/or activity pattern, indicates a degree of relevance of the document object to the environment context and/or activity pattern (e.g., a discrete degree of relevance or a continuous degree of relevance). For example, a weighted contextual label for a particular document object may indicate that the particular document object relates to an "at_meetingA" activity pattern with a degree of relevance that indicates strong relevance of the particular document object with the "at_meetingA" activity pattern.

Examples of spatial labels include absolute spatial labels and weighted spatial labels. An absolute spatial label may be a data object that, when used to associate a document object with a current spatial-temporal state, indicates that the document object is estimated to be relevant to the current spatial-temporal state. For example, an absolute spatial label for a particular document object may indicate that the particular document object relates to an "at_locationA" current spatial-temporal state. A weighted spatial label may be a data object that, when used to associate a document object with a current spatial-temporal state, indicates a degree of relevance of the document object to the current spatial-temporal state (e.g., a discrete degree of relevance or a continuous degree of relevance). For example, a weighted spatial label for a particular document object may indicate that the particular document object relates to an "at_meetingA" current spatial-temporal state with a degree of relevance that indicates strong relevance of the particular document object with the "at_meetingA" current spatial-temporal state.

In some embodiments, the plurality of document objects include one or more document objects associated with the target user profile. In some embodiments, the document collaboration system 105 may define one or more association relationships between user profiles of the document collaboration system 105 and the document objects stored in the document object repository 107 of the document collaboration system 105. For example, a particular document collaboration system 105 may deem a particular user profile and a particular document object to have an association relationship if one or more of the following conditions are met with respect to the particular user profile and the particular document object: (i) the particular user profile is a creator of the particular document object, and (ii) another user profile having an association relationship with the particular document object has given sufficient access privileges (e.g., read or write access privileges, write-only access privileges, etc.) to the particular user profile with respect to the particular document object.

As another example, a particular document collaboration system 105 may deem a particular user profile and a particular document object to have an association relationship if one or more of the following conditions are met with respect to the particular user profile and the particular document object: (i) if the particular document object is in a personal document collaboration space of the particular user profile, (ii) if another user profile having the particular document object in its personal document collaboration space has given sufficient access privileges (e.g., read or write access privileges, write-only access privileges, etc.) to the particular user profile with respect to the particular document object, and (iii) if the particular document object is in a collective document collaboration space associated with the particular user profile.

In some embodiments, a document collaboration space is a data object associated with one or more enrolled user profiles that enables giving defined access privileges to each related user profile associated with the document collaboration space with respect to a particular document object by associating the particular document object with the document collaboration space. Examples of document collaboration spaces include personal document collaboration spaces and collective document collaboration spaces. A personal document collaboration space may be a space that is statically (i.e., immutably) associated with a single enrolled user profile, while a collective document collaboration space may be a space that is dynamically (i.e., in a modifiable manner) associated with one or more enrolled user profiles. Examples of collective document collaboration spaces include team document collaboration spaces associated with one or more team member user profiles, project document collaboration spaces associated with one or more project participant user profiles, site document collaboration spaces associated with one or more site user profiles, etc.

In some embodiments, collective document collaboration spaces associated with a document collaboration system 105 may be divided into various categories based on at least one of an expected subject matter of content associated with each collective document collaboration space category, access privilege parameters of each collective document collaboration space category, etc.

An example of a personal document collaboration space category 601 and examples of various document space categories 602-605 are presented in the document collaboration space creation user interface 600 of FIG. 6. As depicted in FIG. 6, the document space categories 602-605 include a documentation space category 602 for collective document collaboration spaces that contain documentation information, a knowledgebase space category 603 for collective document collaboration spaces that contain knowledgebase information, a software project space category 604 for collective document collaboration spaces that contain software project documents (e.g., source code documents, executable files, etc.), and a team space 605 for collective document collaboration spaces that contain documents of relevance to a particular team.

Returning to FIG. 4, in some embodiments, identifying the one or more document objects associated with a target user profile of the document collaboration system is performed based on a current document collaboration space associated with the target user profile. As depicted in the document collaboration space selection user interface 700 of FIG. 7, the document collaboration system 105 may enable the target user profile to select a document collaboration space of the various spaces associated with the target user profile to work in. In some embodiments, the document collaboration server 106 may automatically select a current document collaboration space for the target user profile based on at least one of a location of the target user profile, a current activity of the target user profile, a spatial-temporal state of the target user profile, etc. In some embodiments, the document collaboration server 106 may include document objects associated with the current document collaboration space in the identified one or more document objects associated with the target user profile and exclude document objects that are not associated with the current document collaboration space from the identified one or more document objects associated with the target user profile even if those document objects are associated with one or more other document collaboration spaces that are associated with the target user profile.

At operation 403, the document collaboration server 106 determines, for each document object of the plurality of document objects, a spatial-temporal relevance score for the document object with respect to the target user profile based on the one or more contextual labels for the document object, the one or more spatial labels for the document object, and the current spatial-temporal state of the target user profile. A spatial-temporal relevance score for a document object with respect to a user profile is a data object that indicates an estimated relevance of the document to the user profile given a current spatial-temporal state of the user profile.

In some embodiments, to generate a spatial-temporal relevance score for a document object with respect to a user profile, the document collaboration server 106 generates a relevance score vector that includes a relevance score for the document object with respect to each of a set of potential spatial-temporal states and selects, from the relevance score vector, the relevance score associated with the current spatial-temporal state of the user profile. In some embodiments, to generate a spatial-temporal relevance score for a document object with respect to a user profile, the document collaboration server 106 generates a relevance score for each contextual label or each spatial label of the document object with respect to the current spatial temporal state of the user profile and aggregates (e.g., averages) each generated relevance score to generate the spatial-temporal relevance score.

In some embodiments, the one or more contextual labels for a document object of the plurality of document objects comprise one or more topical labels, the spatial-temporal relevance score for a document object of the plurality of document objects is determined further based on a correlation score between the one or more topical labels for the document object and an intention prediction for the target user profile, and the intention prediction for the target user profile is determined based on the current spatial-temporal state of the target user profile. In some embodiments, the one or more contextual labels for a document object of the plurality of document objects comprise one or more mobility association labels, the spatial-temporal relevance score for a document object of the plurality of document objects is determined further based on a correlation score between the one or more mobility association labels for the document object and a mobility designation for the target user profile, and the mobility designations for the target user profile is determined based on the current spatial-temporal state of the target user profile.

In some embodiments, to generate the spatial-temporal relevance score for the document object with respect to the target user profile based on the one or more contextual labels for the document object, the one or more spatial labels for the document object, and the current spatial-temporal state of the target user profile, the document collaboration server 106 utilizes a machine learning model. For example, the document collaboration server 106 may supply the one or more contextual labels for the document object, the one or more spatial labels for the document object, and the current spatial-temporal state of the target user profile as inputs to a trained supervised machine learning model (e.g., a trained neural network model) configured to generate the spatial-temporal relevance score for the document object with respect to the target user profile based on the supplied inputs. In some embodiments, the trained supervised machine learning model may be trained using training data generated based on past user activity data associated with the target user profile and/or with user profiles determined to be similar demographically and/or in terms of activity metrics to the target user profile. As another example, the document collaboration server 106 may use the one or more contextual labels for the document object and the one or more spatial labels for the document object to map a current activity session in a multi-dimensional space that also includes mappings of other activity sessions associated with the current spatial-temporal state, where the other activity sessions have preconfigured spatial-temporal relevance scores. The document collaboration server 106 may then identify (e.g., using a clustering algorithm) based on a portion of the preconfigured spatial-temporal relevance scores associated with a portion of the other activity sessions associated with the current activity session.

At operation 404, the document collaboration server 106 generates a spatially dynamic document prediction interface based on the spatial-temporal relevance score for each document object of the plurality of document objects. A spatially dynamic document prediction interface is a user interface configured to present indications of a group of document objects based on spatial-temporal relevance scores associated with the document objects. In some embodiments, a spatially dynamic document prediction interface includes indications of a preconfigured number of document objects having the highest spatial-temporal relevance score. In some embodiments, a spatially dynamic document prediction interface includes indications of any document objects whose respective spatial-temporal relevance scores exceed a document presentation threshold. In some embodiments, a spatially dynamic document prediction interface is accessible using a sidebar icon, e.g., the sidebar icon 801 in the sidebar user interface 800 of FIG. 8.

In some embodiments, generating the spatially dynamic document prediction interface comprises identifying a reduced set of the plurality of document objects satisfying a predetermined spatial-temporal relevance score criterion (e.g., having a highest spatial-temporal relevance score), and generating the spatially dynamic document prediction interface to comprise reduced indications of each of the reduced set of the plurality of document objects. In some embodiments, the document collaboration server 106 determines whether a reduced set of the plurality of document objects whose respective spatial-temporal relevance scores satisfy a critical relevance threshold criterion (e.g., exceed a critical relevance threshold) is non-empty; and in response to determining that subset of the plurality of document objects is non-empty, generates a push notification user interface (e.g., the push notification user interface 900 of FIG. 9) that comprise reduced indications of each of the reduced set of the plurality of document objects. In some embodiments, the document collaboration server 106 utilizes spatial-temporal relevance scores to organize presentation of document objects in response to document search requests and/or document listing requests.

In some embodiments, an end-user may be configured to generate geolocation designations for various geographic areas in a geographic region using a geolocation designation interface, such as the geolocation designation interface 1100 of FIG. 11. As depicted in FIG. 11, the geolocation designation interface 1100 contains a map user interface element 1110. By interacting with the map user interface element 110, an end-user can designate geographic locations and thus generate geolocation designations. For example, the map user interface element 1110 depicted in FIG. 11 includes a "Home" geographic designation 1101, a "Work" geographic designation 1102, a "Gym" geographic designation 1103, and a "Supermarket" geographic designation 1104.

Defining a geographic designation may enable the end-user to retrieve document objects deemed related to the geographic designation when the end-user is determined to be at an area sufficiently proximate to the geographic designation and/or when the end-user is determined to be in a predicted travel category whose destination designation is the geographic designation.

For example, as depicted in the spatially dynamic document prediction interface 1201 of FIG. 12A, when the end-user is determined to be at an area sufficiently proximate to the geographic designation 1101 and/or when the end-user is determined to be in a predicted travel category whose destination designation is the geographic designation 1101, interaction with the side-bar interface element 1210 causes a display of indications of home-related document objects.

As another example, as depicted in the spatially dynamic document prediction interface 1202 of FIG. 12B, when the end-user is determined to be at an area sufficiently proximate to the geographic designation 1102 and/or when the end-user is determined to be in a predicted travel category whose destination designation is the geographic designation 1102, interaction with the side-bar interface element 1210 causes a display of indications of work-related document objects.

As yet another example, as depicted in the spatially dynamic document prediction interface 1203 of FIG. 12C, when the end-user is determined to be at an area sufficiently proximate to the geographic designation 1103 and/or when the end-user is determined to be in a predicted travel category whose destination designation is the geographic designation 1103, interaction with the side-bar interface element 1210 causes a display of indications of gym-related document objects.

As a further example, as depicted in the spatially dynamic document prediction interface 1204 of FIG. 12D, when the end-user is determined to be at an area sufficiently proximate to the geographic designation 1104 and/or when the end-user is determined to be in a predicted travel category whose destination designation is the geographic designation 1104, interaction with the side-bar interface element 1210 causes a display of indications of supermarket-related document objects.

Additional Implementation Details

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. An apparatus for rendering a spatially dynamic document prediction interface in a document collaboration system, the apparatus comprising at least one processor and at least one non-transitory memory comprising program code, wherein the at least one non-transitory memory and the program code are configured to, with the at least one processor, cause the apparatus to:

determine a current spatial-temporal state for a mobile device associated with a target user profile, wherein the current spatial-temporal state is determined based on a current geolocation designation for the mobile device, a current mobility designation for the mobile device, and a geolocation correlation between the current geolocation designation for the mobile device and geolocation coordinates of predefined locations;

access a document object repository of the document collaboration system comprising a plurality of document objects associated with the target user profile, wherein each document object of the plurality of document objects comprises contextual labels and spatial labels, wherein the plurality of document objects are associated with a plurality of document collaboration spaces, and further wherein the plurality of document collaboration spaces comprise one or more personal document collaboration spaces and one or more collective document collaboration spaces;

for each document object of the plurality of document objects, determine a spatial-temporal relevance score for the document object with respect to the target user profile based on the contextual labels for the document object, the spatial labels for the document object, and the current spatial-temporal state of the target user profile; and generate the spatially dynamic document prediction interface based on the spatial-temporal relevance score for each document object of the plurality of document objects, wherein the spatially dynamic document prediction interface is configured to display indications of a predicted set of document objects of the plurality of document objects that are respectively associated with spatial-temporal relevance scores that satisfy a predetermined spatial-temporal relevance criterion.

2. The apparatus of claim 1, wherein the current spatial-temporal state for the target user profile is determined based on a geolocation identifying data object received from the mobile device of the target user profile.

3. The apparatus of claim 1, wherein:
the contextual labels for the document object of the plurality of document objects comprise one or more topical labels,
the spatial-temporal relevance score for the document object of the plurality of document objects is determined further based on a correlation score between the one or more topical labels for the document object and an intention prediction for the target user profile, and
the intention prediction for the target user profile is determined based on the current spatial-temporal state of the target user profile.

4. The apparatus of claim 1, wherein:
the contextual labels for the document object of the plurality of document objects comprise one or more mobility association labels,
the spatial-temporal relevance score for the document object of the plurality of document objects is determined further based on a correlation score between the one or more mobility association labels for the document object and a mobility designation for the target user profile, and
the mobility designation for the target user profile is determined based on the current spatial-temporal state of the target user profile.

5. The apparatus of claim 1, wherein generating the spatially dynamic document prediction interface comprises:
identifying a reduced set of the plurality of document objects satisfying a predetermined spatial-temporal relevance score criterion, and
generating the spatially dynamic document prediction interface to comprise reduced indications of each of the reduced set of the plurality of document objects.

6. The apparatus of claim 1, wherein the at least one non-transitory memory and the program code are configured to, with the at least one processor, further cause the apparatus to:
determine whether a reduced set of the plurality of document objects whose respective spatial-temporal relevance scores satisfy a critical relevance threshold criterion is non-empty; and
in response to determining that the reduced set of the plurality of document objects is non-empty, generate a push notification user interface that comprise reduced indications of each of the reduced set of the plurality of document objects.

7. The apparatus of claim 1, wherein determining the current spatial-temporal state comprises:
identifying the current geolocation designation and the current mobility designation of the mobile device,
generating a predicted travel trajectory for the mobile device based on the current geolocation designation and the current mobility designation of the mobile device, and
determining the current spatial-temporal state based on the predicted travel trajectory.

8. The apparatus of claim 1, wherein the at least one non-transitory memory and the program code are configured to, with the at least one processor, cause the apparatus to:
for each personal document collaboration space, determine a single enrolled user profile;
for each collective document collaboration space, determine an enrolled user profile set; and
determine that the document object from the document object repository is one of the plurality of document objects that are associated with the target user profile if:
the document object is in a user personal document collaboration space of the one or more personal document collaboration spaces that is associated with the target user profile as the single enrolled user profile for the user personal document collaboration space,
the document object is in a personal document collaboration space other than the user personal document collaboration space and the single enrolled user profile associated with the personal document collaboration space has granted a document access privilege for the document object to the target user profile, or
the document object is in a collective document collaboration space that is associated with the target user profile as an enrolled user profile in the enrolled user profile set for the collective document collaboration space.

9. The apparatus of claim 1, wherein:
each personal document collaboration space is statically associated with a single enrolled user profile, and
each collective document collaboration space is dynamically associated with one or more enrolled user profiles.

10. The apparatus of claim 1, wherein:
the current spatial-temporal state is determined based on a predicted travel trajectory of the mobile device,
the predicted travel trajectory is determined based on the current geolocation designation of the mobile device and the current mobility designation of the mobile device,
the current mobility designation is determined based on comparing a plurality of geolocation designations of the mobile device that are recorded across a temporally continuous time period, and
the current mobility designation describes a detected direction of a detected move by the mobile device away from the current geolocation designation and a detected magnitude of the detected move.

11. The apparatus of claim 1, wherein:
the current spatial-temporal state comprises a user mobility designation for the target user profile that is determined based on a predicted travel trajectory of the mobile device,
the contextual labels for the document object of the plurality of document objects comprise one or more mobility association labels, and
the spatial-temporal relevance score for the document object of the plurality of document objects is determined based on a correlation score between the one or more mobility association labels for the document object and the user mobility designation.

12. A computer-implemented method for rendering a spatially dynamic document prediction interface in a document collaboration system, the computer-implemented method comprising:

determining a current spatial-temporal state for a mobile device associated with a target user profile, wherein the current spatial-temporal state is determined based on a current geolocation designation for the mobile device, a current mobility designation for the mobile device, and a geolocation correlation between the current geolocation designation for the mobile device and geolocation coordinates of predefined locations;

accessing a document object repository of the document collaboration system comprising a plurality of document objects associated with the target user profile, wherein each document object of the plurality of document objects comprises contextual labels and spatial labels, wherein the plurality of document objects are associated with a plurality of document collaboration spaces, and further wherein the plurality of document collaboration spaces comprise one or more personal document collaboration spaces and one or more collective document collaboration spaces;

for each document object of the plurality of document objects, determining a spatial-temporal relevance score for the document object with respect to the target user profile based on the contextual labels for the document object, the spatial labels for the document object, and the current spatial-temporal state of the target user profile; and generating the spatially dynamic document prediction interface based on the spatial-temporal relevance score for each document object of the plurality of document objects, wherein the spatially dynamic document prediction interface is configured to display indications of a predicted set of document objects of the plurality of document objects that are respectively associated with spatial-temporal relevance scores that satisfy a predetermined spatial-temporal relevance criterion.

13. The computer-implemented method of claim 12, wherein the current spatial-temporal state for the target user profile is determined based on a geolocation identifying data object received from the mobile device of the target user profile.

14. The computer-implemented method of claim 12, wherein:
the contextual labels for the document object of the plurality of document objects comprise one or more topical labels,
the spatial-temporal relevance score for the document object of the plurality of document objects is determined further based on a correlation score between the one or more topical labels for the document object and an intention prediction for the target user profile, and
the intention prediction for the target user profile is determined based on the current spatial-temporal state of the target user profile.

15. The computer-implemented method of claim 12, wherein:
the contextual labels for the document object of the plurality of document objects comprise one or more mobility association labels,
the spatial-temporal relevance score for the document object of the plurality of document objects is determined further based on a correlation score between the one or more mobility association labels for the document object and a mobility designation for the target user profile, and
the mobility designation for the target user profile is determined based on the current spatial-temporal state of the target user profile.

16. The computer-implemented method of claim 12, wherein generating the spatially dynamic document prediction interface comprises:
identifying a reduced set of the plurality of document objects satisfying a predetermined spatial-temporal relevance score criterion, and
generating the spatially dynamic document prediction interface to comprise an indication of each of the reduced set of the plurality of document objects.

17. The computer-implemented method of claim 12, further comprising:
determining whether a reduced set of the plurality of document objects whose respective spatial-temporal relevance scores satisfy a critical relevance threshold criterion is non-empty; and
in response to determining that subset of the plurality of document objects is non-empty, generating a push notification user interface that comprise reduced indications of each of the subset of the plurality of document objects.

18. The computer-implemented method of claim 12, wherein determining the current spatial-temporal state comprises:
identifying the current geolocation designation and the current mobility designation of the mobile device,
generating a predicted travel trajectory for the mobile device based on the current geolocation designation and the current mobility designation of the mobile device, and
determining the current spatial-temporal state based on the predicted travel trajectory.

19. A computer program product for rendering a spatially dynamic document prediction interface in a document collaboration system, the computer program product comprising at least one non-transitory computer-readable storage medium having computer-readable program code portions stored therein, the computer-readable program code portions configured to:
determine a current spatial-temporal state for a mobile device associated with a target user profile, wherein the current spatial-temporal state is determined based on a current geolocation designation for the mobile device, a current mobility designation for the mobile device, and a geolocation correlation between the current geolocation designation for the mobile device and geolocation coordinates of predefined locations;
access a document object repository of the document collaboration system comprising a plurality of document objects associated with the target user profile, wherein each document object of the plurality of document objects comprises contextual labels and spatial labels, wherein the plurality of document objects are associated with a plurality of document collaboration spaces, and further wherein the plurality of document collaboration spaces comprise one or more personal document collaboration spaces and one or more collective document collaboration spaces;
for each document object of the plurality of document objects, determine a spatial-temporal relevance score for the document object with respect to the target user profile based on the contextual labels for the document object, the spatial labels for the document object, and the current spatial-temporal state of the target user profile; and
generate the spatially dynamic document prediction interface based on the spatial-temporal relevance score for each document object of the plurality of document objects, wherein the spatially dynamic document prediction interface is configured to display indications of a predicted set of document objects of the plurality of document objects that are respectively associated with spatial-temporal relevance scores that satisfy a predetermined spatial-temporal relevance criterion.

* * * * *